United States Patent [19]
Ishii

[11] Patent Number: 5,901,854
[45] Date of Patent: May 11, 1999

[54] OBJECT SORTING AND CONVEYING APPARATUS

[76] Inventor: Toru Ishii, 66, Takaoaka-Cho, Matsuyama-Shi, Ehime-Pre, Japan

[21] Appl. No.: 08/861,999

[22] Filed: May 24, 1997

[51] Int. Cl.⁶ ........................................ B07C 5/02
[52] U.S. Cl. .................. 209/538; 209/564; 209/698; 209/912; 198/370.04; 198/411; 198/779
[58] Field of Search .................. 209/538, 540, 209/698, 912, 919, 564; 198/370.04, 411, 414, 779

[56] References Cited

U.S. PATENT DOCUMENTS

| | | | |
|---|---|---|---|
| 4,585,126 | 4/1986 | Paddock et al. | 209/912 X |
| 5,020,675 | 6/1991 | Cowlin et al. | 209/538 |
| 5,029,692 | 7/1991 | Warkentin | 209/912 X |
| 5,280,838 | 1/1994 | Blanc | 209/912 X |
| 5,306,877 | 4/1994 | Tas | 198/365 X |

FOREIGN PATENT DOCUMENTS

| | | | |
|---|---|---|---|
| 491407 | 6/1992 | European Pat. Off. | 209/912 |
| 1-24551 | 5/1989 | Japan . | |

*Primary Examiner*—Tuan N. Nguyen
*Attorney, Agent, or Firm*—Moonray Kojima

[57] ABSTRACT

The invention relates to an object sorting and conveying apparatus used in the work for sorting and conveying objects, wherein multiple rotary support elements for mounting objects are disposed at the side of a conveying belt stretched in a conveying route orthogonally in the feed direction, the rotary support elements are rotated at the object inspection position for inverting and rotating the objects, the rotary support elements are designed to turn between a mounting position for mounting on the upper part and a tilting position for discharging objects, about the conveying belt side, and the objects can be inspected accurately by inverting and rotating the objects, and the position control and discharge of objects are also easy.

4 Claims, 16 Drawing Sheets

OBJECT SORTING AND CONVEYING APPARATUS

BACKGROUND OF THE INVENTION

1. Field of the Invention

The present invention relates to an object sorting and conveying apparatus used in sorting and conveying work of objects, for example, orange, persimmon, other fruits, potato, other vegetables, electrical and mechanical parts, and golf balls.

2. Description of the Prior Art

A conventional object sorting and conveying apparatus of this sort is disclosed, for example, in Japanese Patent Publication No. 1-24551.

That is, near the inlet of a fruit sorting conveyor, an inspection position for measuring the outside diameter and appearance of fruits is set, and a classing unit for discharging and sorting the fruits according to the class on the basis of the inspection result is set at the downstream side of the inspection position, while multiple receiving slats are attached to the chain for composing the fruit sorting conveyor through attachments so as to put fruits on the receiving slats, and the receiving slats are designed to be rotatable between the horizontal position for putting fruits on and the nearly vertical drooping position for dropping the fruits at the classing unit.

In this constitution, however, since the fruits put on the receiving slats cannot be inverted, the fruits can be inspected only from above at the inspection position, and the reverse side cannot be inspected, and it was difficult to inspect the fruits strictly, and appropriate classing or sorting could not be done.

SUMMARY OF THE INVENTION

It is hence a primary object of the invention to provide an object sorting and conveying apparatus characterized by disposing multiple rotary support elements at the conveying side of a conveying belt stretched at the side of a conveying route orthogonally to the feed direction, composing each rotary support element so as to be rotatable between a mounting position for putting objects on an upper part thereof, and a tilting position for discharging objects at a specified position, and comprising rotary means for rotating the rotary support element at an object inspection position where object imaging means is provided, and therefore, at the inspection position, the objects put on the upper part can be rotated through the rotary support element, and the object can be inspected accurately and securely by the imaging means from all directions including the upper and lower sides, and right and left sides, and the position control and discharge of objects are also easy.

It is other object of the invention to provide an object sorting and conveying apparatus characterized by disposing a lifting member for lifting at least part of the object for correcting the object mounted between the rotary support elements into a specified position (for example, horizontal position), in the gap between the rotary support elements, and therefore, while effectively utilizing the gap between the rotary support elements, the object caught in between the rotary support elements, or the object being conveyed obliquely or upside down can be corrected into a specified position regardless of the size, so that accurate inspection can be done in the same condition.

It is a different object of the invention to provide an object sorting and conveying apparatus characterized by inserting the lifting member between the rotary support elements, and controlling so as to move in and out between a projecting position for lifting at least part of the object, and a sinking position for sinking beneath the rotary support elements, and therefore the object position is corrected to horizontal position when projecting the lifting member, and the corrected object is mounted again between the rotary support elements in horizontal state when the lifting member sinks, so that the object conveying position is stabilized.

It is a different object of the invention to provide an object sorting and conveying apparatus characterized by constituting so that the rotary support element and lifting member may be simultaneously inclined downward about the conveying belt side at the object discharge position, and therefore the object can be smoothly discharged obliquely downward along the slope.

It is a different object of the invention to provide an object sorting and conveying apparatus characterized by constituting so that the upper edge of the lifting member may be positioned higher than the upper surface of the lowered rotary support element at the lower limit position when the rotary support element and lifting member are tilted, and therefore the object can be discharged smoothly along the upper edge of the lifting member which is inclined moderately, and change of direction or position of the object can be prevented.

It is a different object of the invention to provide an object sorting and conveying apparatus characterized by comprising imaging means for taking the object mounted on the rotary support member at the inspection position, and judging means for judging the quality of the object on the basis of the data taken by the imaging means, and therefore the quality or class of the object can be judged automatically.

It is a different object of the invention to provide an object sorting and conveying apparatus characterized by comprising a carry conveyor including multiple rotary support elements and a feed conveyor for feeding objects into the carry conveyor, and disposing holding means (for example, a flexible endless belt) for holding the object position between these conveyors, and therefore, in spite of a simple constitution, motion of the object transferred from the feed conveyor to the carry conveyor is prevented, and the object can be supplied while keeping favorable the direction, position and interval.

Further objects of the invention will be better understood from the following detailed description of the embodiments.

DESCRIPTION OF THE PREFERRED EMBODIMENTS

Figure 1:
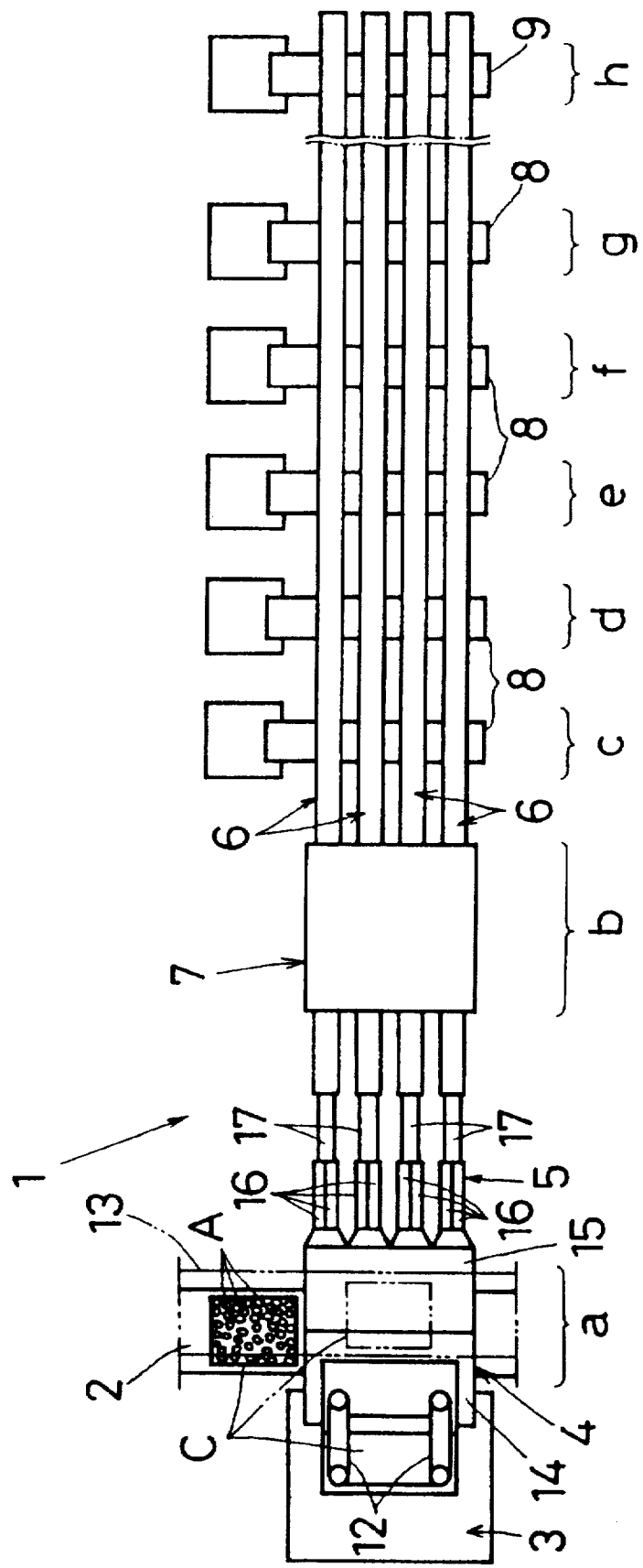
FIG. 1 is a plan view showing a general structure of an object sorting and conveying apparatus of the invention.

Referring now to the drawings, preferred embodiments of the invention are described below.

Figure 2:
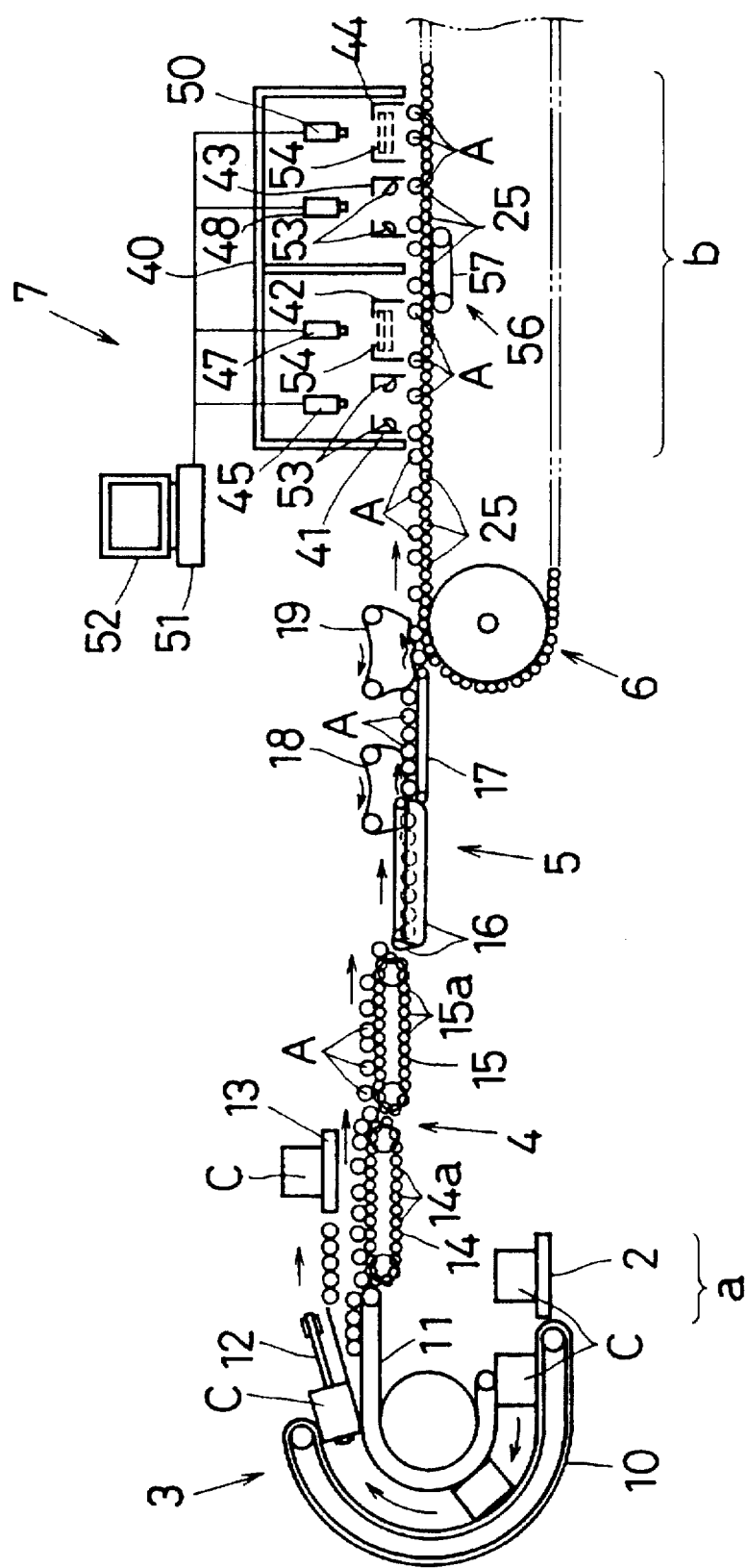
FIG. 2 is an essential side view of FIG. 1.

The drawings show a sorting and conveying apparatus for dividing multiple oranges into classes as an example of an object sorting and conveying apparatus, and in FIG. 1 and FIG. 2, this sorting and conveying apparatus 1 inverts a carrying case C upside down by a discharge machine 3 disposed at a feed position a on an entry conveyor 2, and discharges unsorted oranges A put in the carrying case C into a disperse conveyor 4.

The oranges A dispersed by the disperse conveyor 4 are distributed into four arraying conveyors 5, and the oranges A arrayed in one line by the arraying conveyor 5 are divided into four rows, and sequentially transferred to a classing conveyor 6.

By a class inspection device 7 disposed at an inspection position b on the classing conveyor 6, the class of the oranges A is judged, and according to the judgement, the oranges A are discharged by class into discharge conveyors 8 disposed at classing positions c to g on the classing conveyor 6, and off-standard oranges A are shown into a recovery conveyor 9 disposed at classing position h.

The discharge machine 3 stretches inverting conveyors 10, 11 (see FIG. 2) orthogonally to one side edge of the feed position a set on the entry conveyor 2 as shown in FIG. 1, and the inverting conveyors 10, 11 are formed in the conveying width for holding the carrying case C, and are spaced at a clearance for holding the carrying case C.

The carrying case C in which unsorted oranges C are thrown is inverted up and down while being conveyed by pressing and holding the upper and lower sides by the inverting conveyors 10, 11. The carrying case C is lifted obliquely upward by pressing and holding the both sides by right and left pressing belts 12, 12 stretched at the feed terminal end portion of the inverting conveyor 11, and all oranges A thrown into the carrying case C are discharged into the inverting conveyor 11.

All oranges A are transferred into the disperse conveyor 4 stretched closely to the feed terminal end portion of the inverting conveyor 11. An empty carrying case C is transferred onto an exit conveyor 13 stretched at the upper side, and is sent into a recovery process (not shown).

The disperse conveyor 4 stretches a first conveyor 14 closely to the lower part of the terminal end side of the inverting conveyor 11, and stretches a second conveyor 15 closely to the lower part of the terminal end side of the first conveyor 14.

These conveyors 14, 15 have multiple disperse rollers 14a, 15a stretched at intervals for putting oranges A in various sizes in the feed direction, and rotate the disperse rollers 14a, 15a while moving in the feed direction, and disperse multiple oranges A in longitudinal and lateral directions to transfer onto the arraying conveyor 5. Instead of the rollers, meanwhile, flat belts may be used for conveying.

Figure 3:
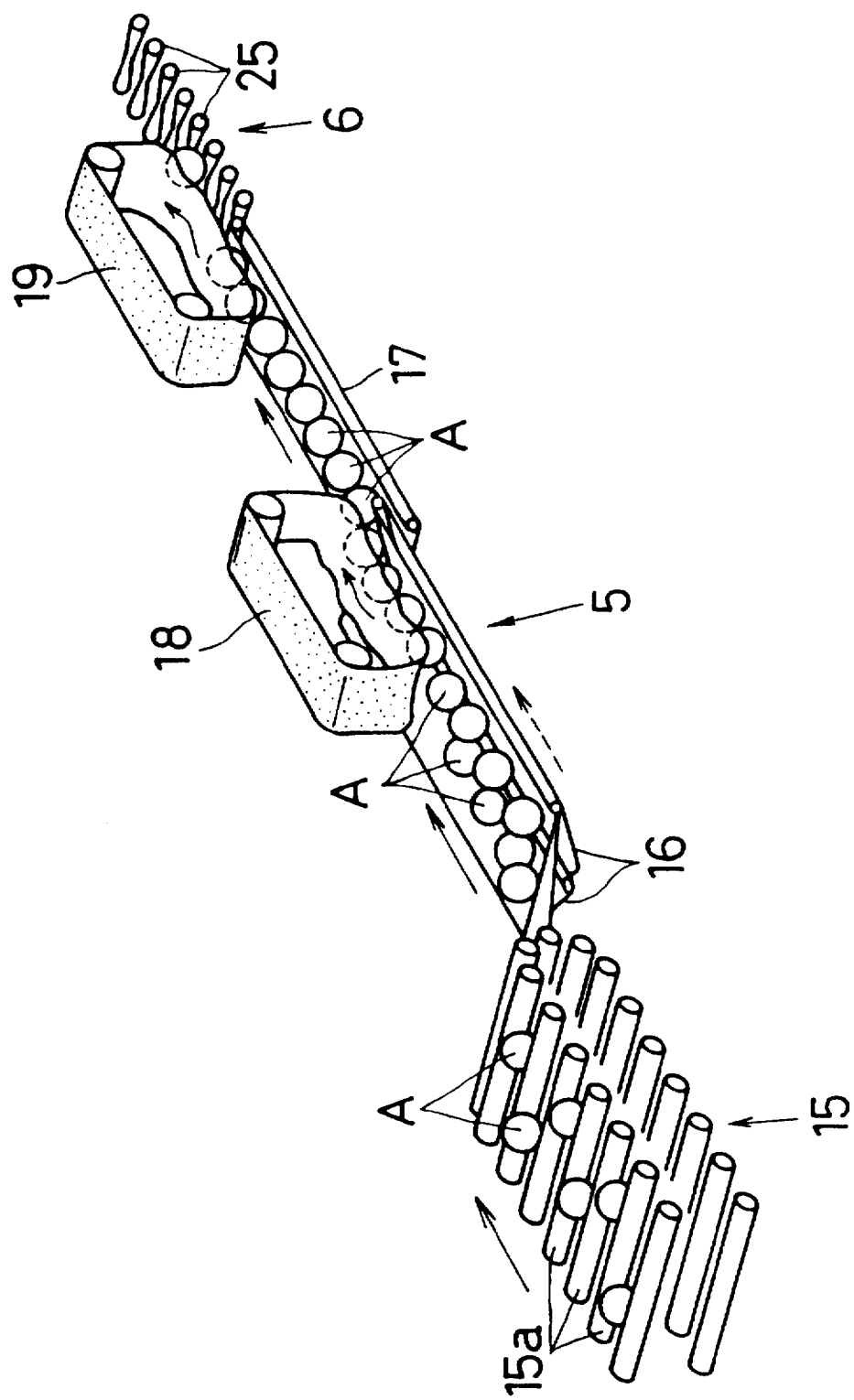
FIG. 3 is a perspective view showing a transfer action by an arraying conveyor.

The arraying conveyor 5 has, as shown in FIG. 3, two feed belts 16, 16 stretched closely to the terminal end portion of the second conveyor 15, and has another feed belt 17 stretched closely to the middle of the terminal end side of the feed belts 16, 16.

The feed belts 16, 16 are obliquely installed so as to form a V-shape in the feed direction, and one feed belt 16 is rotated at low speed and other feed belt 16 is rotated at high speed, and duplicate conveying of oranges A is prevented by the mutual speed difference, so that the oranges are displaced in the longitudinal direction and are securely arrayed in one line.

The feed belt 17 is formed in a conveying width for arraying the oranges A in one line, and is rotated faster than the low speed side and slower than the high speed side, so that the oranges A are arrayed and conveyed in one line.

The oranges A transferred from the feed belts 16, 16 to the feed belt 17 are arrested of unnecessary motion by a pressing belt 18, and are conveyed by keeping the position, while the oranges A transferred from the feed belt 17 into the classing conveyor 6 are also arrested of unnecessary motion by a pressing belt 18 (holding means) stretched in the upper part of the transfer side, and are conveyed by keeping the position.

The pressing belts 18, 19 are formed of endless belts of flexible material such as artificial turf, rubber, or cloth, and the pressing belt 18 is stretched between the upper part of the terminal end side of the feed belts 16, 16 and the upper part of the starting end side of the feed belt 17, and is rotated in synchronism with the feed speed of the feed belt 17, being slacked in a state pressed against the upper peripheral surface of the oranges A.

The pressing belt 19 is stretched between the upper part of the terminal end side of the feed belt 17, and the upper part of the starting end side of the classing conveyor 6, and is rotated in synchronism with the feed speed of the classing conveyor 6, being slacked in a state pressed against the upper peripheral surface of the oranges A.

Accordingly, by this pressing belt 19, the oranges A to be transferred from the feed belt 17 into the classing conveyor 6 can be conveyed with the belt 19 pressed against the upper peripheral surface thereof, and vertical moving, rolling, or change of longitudinal interval of the oranges can be prevented while being transferred, so that the oranges A can be supplied while keeping the same direction, position, and interval.

Figure 5:
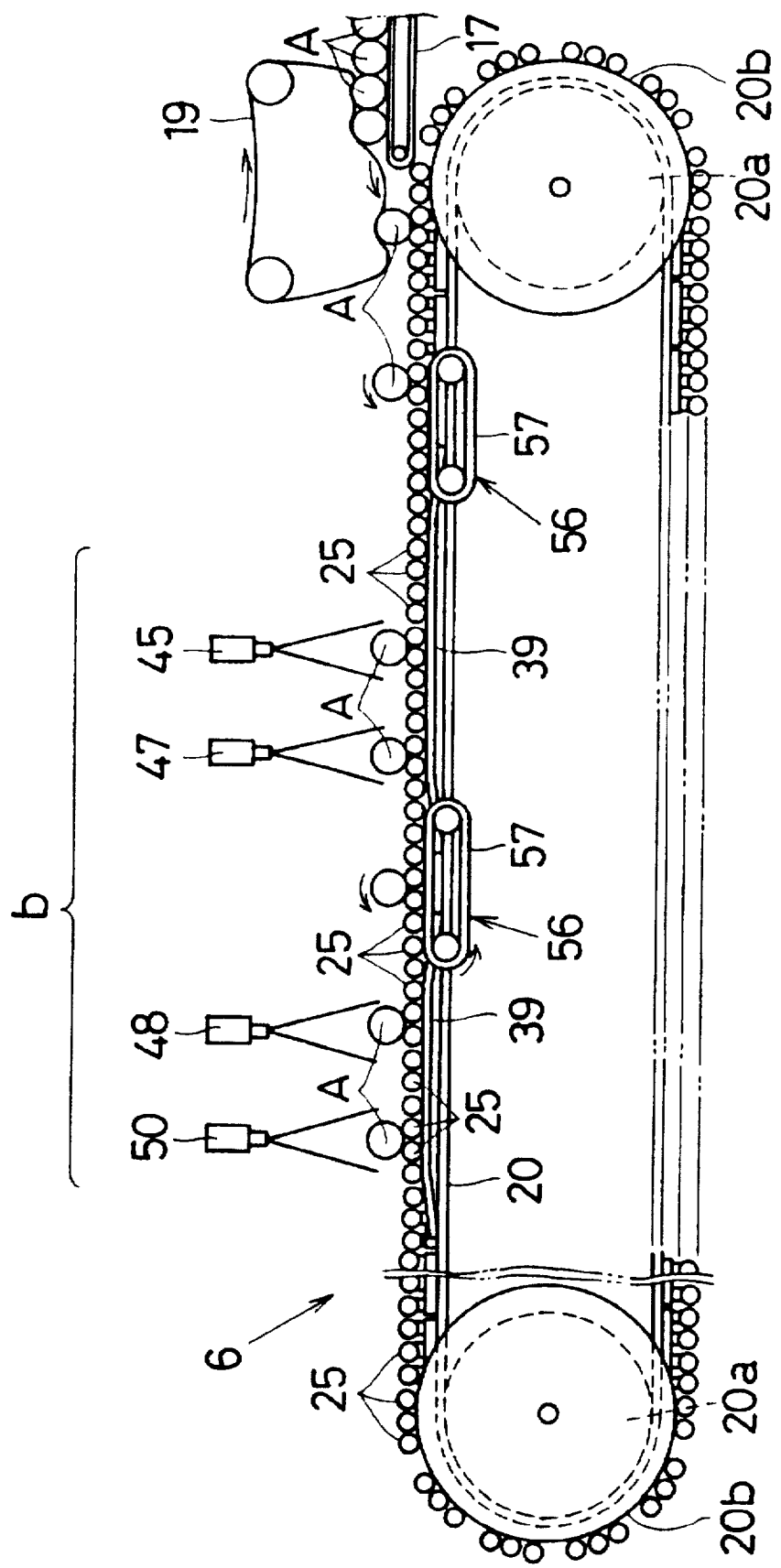
FIG. 5 is a magnified view of a classing conveyor.
Figure 6:
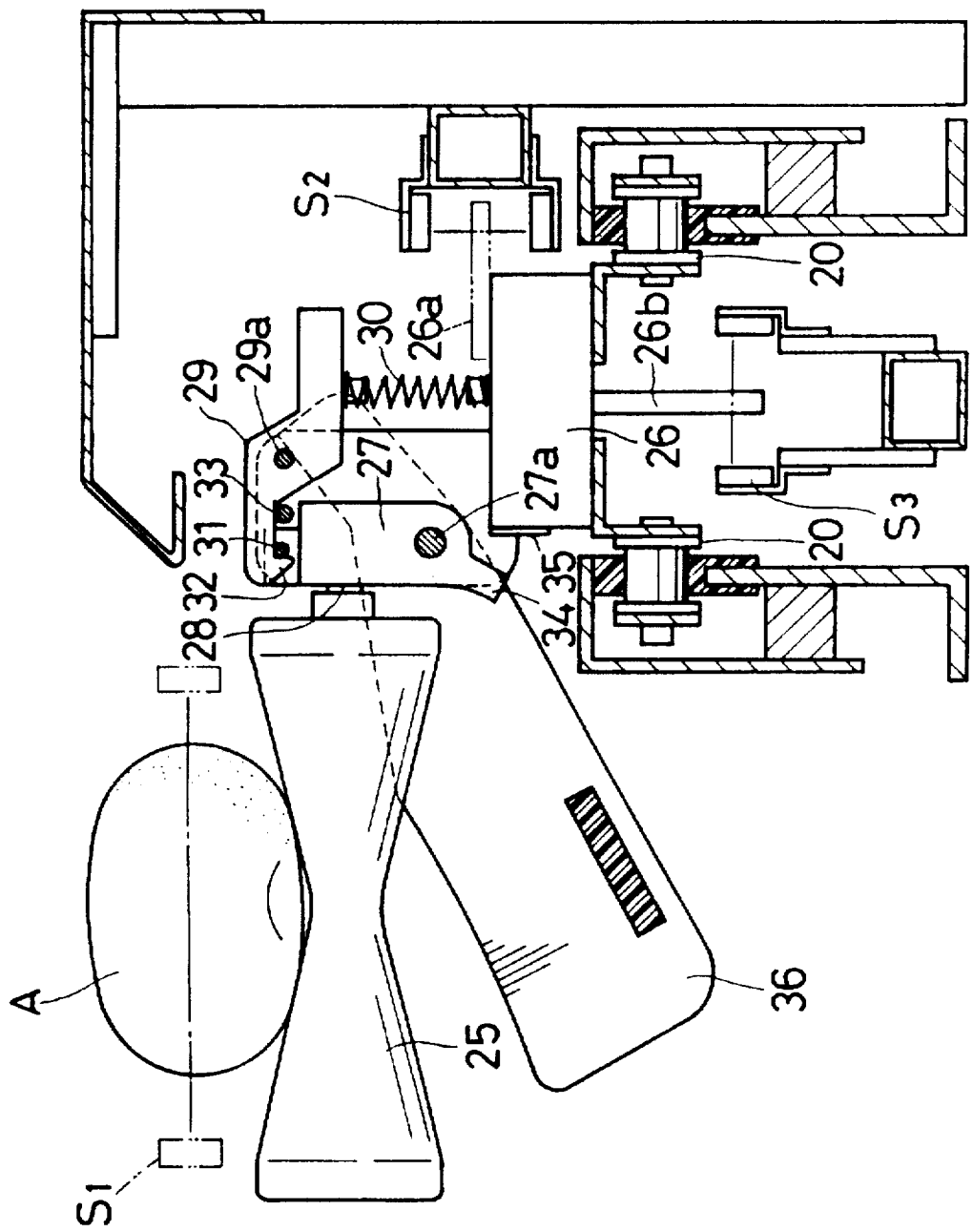
FIG. 6 is an explanatory diagram showing the constitution of rotary support element and lifting member.
Figure 7:
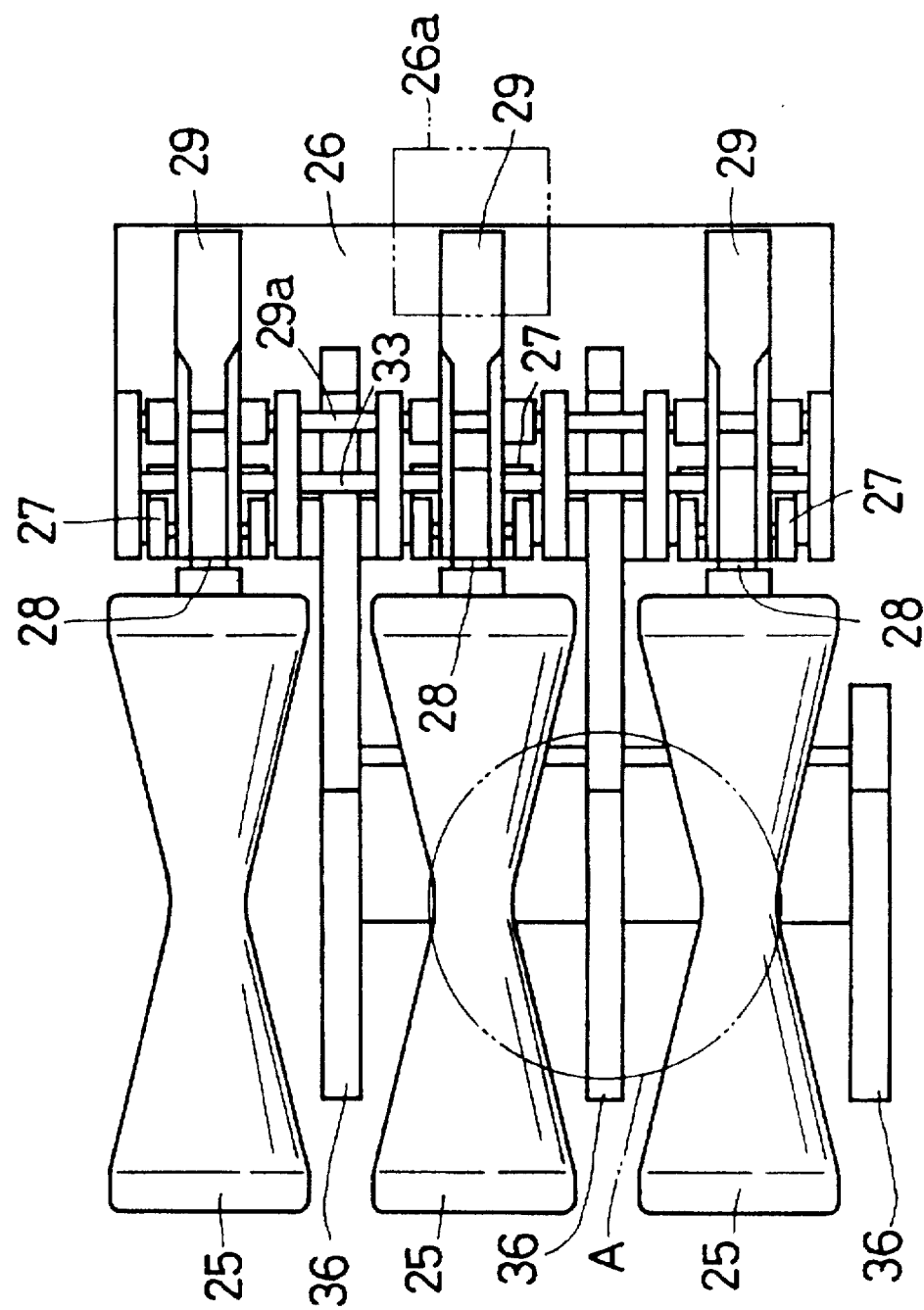
FIG. 7 is a plan view of FIG. 6.

The classing conveyor 6 has, as shown in FIG. 5, FIG. 6, and FIG. 7, a pair of endless belts 20, 20 as conveying belts made of chain or belt stretched at the side of the conveying route, parallel between sprockets 20a, 20a supported at the feed starting end portion and feed terminal end portion, and is rotated in the feed direction by the driving force of a feed motor with reduction gear.

Between upper edges of the endless belts 20, 20, as shown in FIG. 6, a mounting member 26 is fixed at a specific interval in the feed direction, and at the lower end portion of the conveying side of the mounting member 26, a pivotal member 27 is fitted at its lower end so as to be rotatable in a direction orthogonal to the feed direction, and a base part of a support shaft 28 is fixed at the upper end of the pivotal member 27 in a direction orthogonal to the feed direction.

At the free end of the support shaft 28, the axial center of hollow or solid rotary support elements 25 (hereinafter called rollers) is supported rotatably, and, as shown in FIG. 7, the rollers 25 forming a set by three pieces each are supported so as to be rotatable vertically in a direction orthogonal to the feed direction, and multiple sets are arranged at specified intervals for mounting oranges A.

Each roller 25 is moved in the feed direction faster than the feed speed of the feed belt 17 (see FIG. 5), and conveys the oranges A transferred from the feed belt 17 by spacing in the longitudinal direction, and is rotated by rotors 56 as rotating means disposed before the inspection position b and below the inspection position b (see FIG. 5).

At the upper end of the conveying side of the mounting member 26, the central part of a detent lever 29 is supported rotatably in the longitudinal direction, and by a coil spring 30 (thrusting means) interposed between the confronting sides of the mounting member 26 and detent lever 29, a detent pawl 32 formed at the leading end of the detent leer 29 is rotated and thrust in a detent shaft 31 fixed at the upper end of the pivotal member 27 in a direction to be stopped, and the pivotal member 27 and detent lever 29 are brought into contact with a defining shaft 33 fixed at the upper end of the mounting member 26, so that the rotation is defined at the stopping position of the detent shaft 31 and detent pawl 32.

By stopping or clearing the detent shaft 31 and detent pawl 32, the rollers 25 are rotated about the side of the endless belts 20 between the horizontal mounting position for mounting the oranges A on, and the inclined position for discharging them. A defining protrusion 34 projecting to the lower end of the pivotal member 27, and an abutting member 35 made of synthetic rubber fixed to the front end of the conveying side of the mounting member 26 are caused to abut against each other, and the rotation of the rollers 25 is defined in the oblique downward tilting position. Incidentally, only by changing the angle of the defining protrusion 34 and thickness of the abutting members 25, the angle of rotation of the rollers 25 can be freely changed.

On the support shaft 27a for supporting the pivotal member 27, base ends of plate-form lifting members 36, 36 are supported so as to be rotatable vertically, and a rectangular lifting member 36 is linked to the side edge of the middle lifting member 36 shown in FIG. 7. The lifting members 36 are formed in a thickness and shape suitable for projecting and retracting, at a specific clearance to be inserted between rollers 25, and are integrally formed or coupled at a specific clearance for supporting the oranges A in specified position (for example, horizontal).

Figure 12:
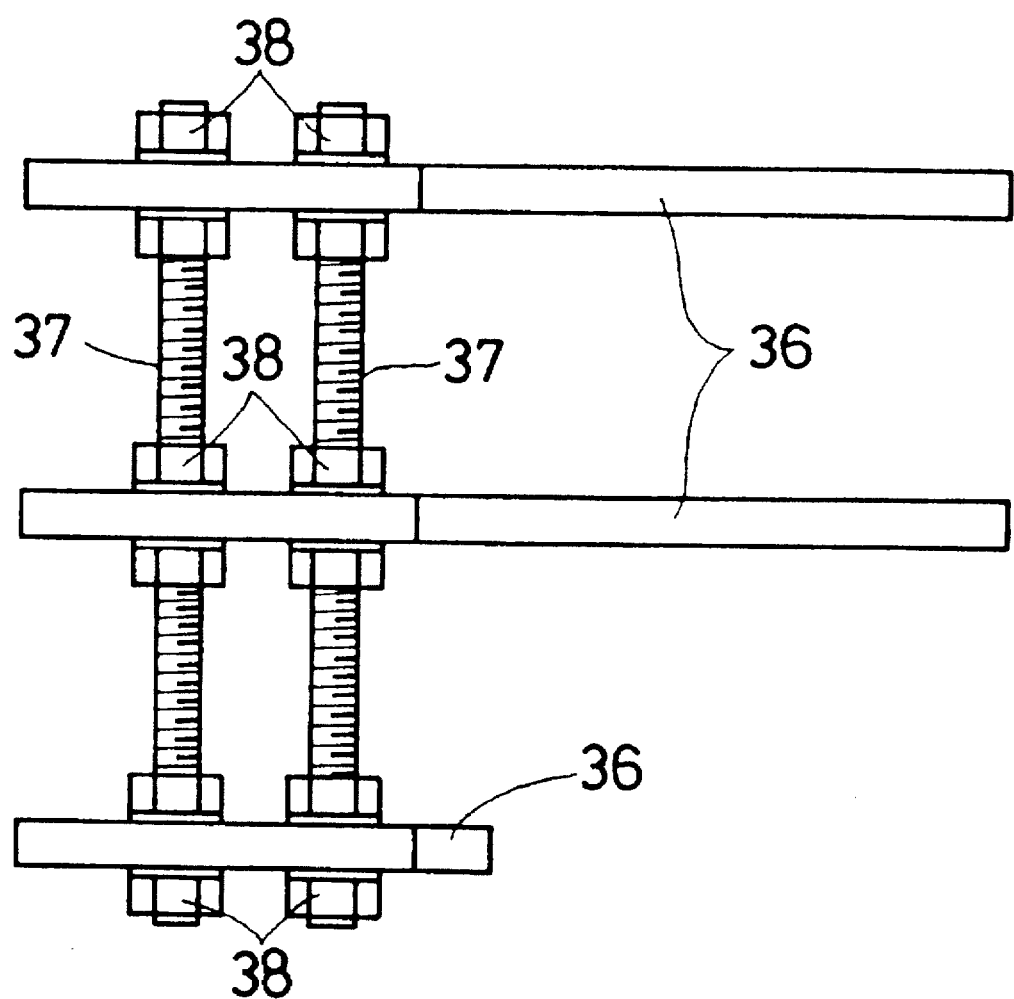
FIG. 12 is a plan view of an embodiment of coupling and fixing three lifting members.
Figure 13:
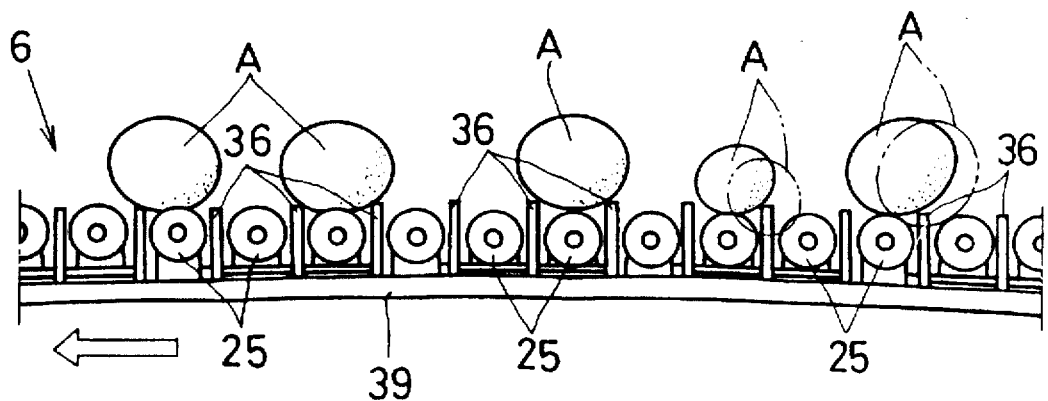
FIG. 13 is a side view showing position correction action by lifting member.
Figure 14:
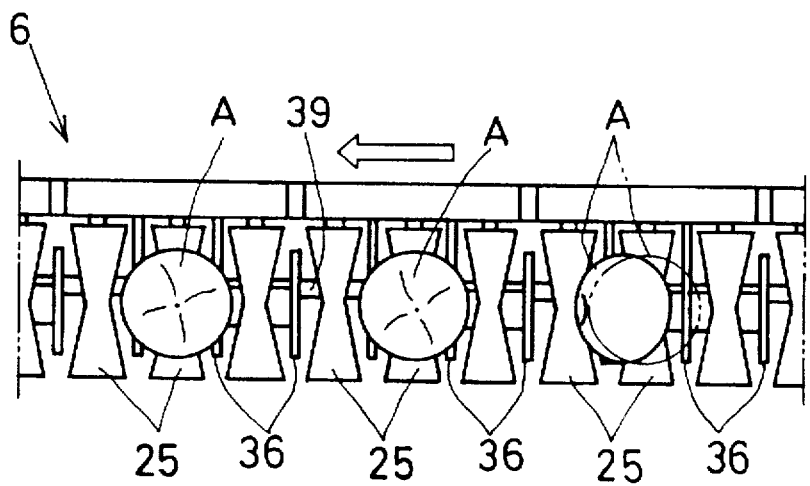
FIG. 14 is a plan view showing position correction action by lifting member.

The lifting members 36 are made of synthetic resin, metal, wood, ceramics, or other material, and the upper edge or the entire structure may be covered with synthetic resin. Moreover, the upper edge or the entire structure may be formed in a shape and size to be inserted between the rollers 25, such as cylindrical, circular columnar, spherical, rhombic, or axial form. By forming into a shape corresponding to the clearance of the rollers 25, change of direction or position of oranges A when lifting or discharging can be prevented. Further, as shown in FIG. 12, the lifting members 36 may be integrally coupled and fixed by bolts 37 and nuts 38, and their interval may be adjustable to a desired interval.

The lower edge of each lifting member 36 can abut against a guide member 39 as projecting and retracting means before and after the lower part stretched in the inspection region before and after in the inspection position b as shown in FIG. 5, FIG. 8, FIG. 13, and FIG. 14, and when each lifting member 36 abuts against the guide member 39, the upper edge of each lifting member 36 is projected slightly higher than the rollers 25 in horizontal mounting position, and the oranges A mounted between the rollers 25 are slightly pushed up, so as to be oscillated and guided to the projecting position for lifting at least part or all of the oranges A from the outer circumference of the rollers 25 in contact-free state.

Figure 8:
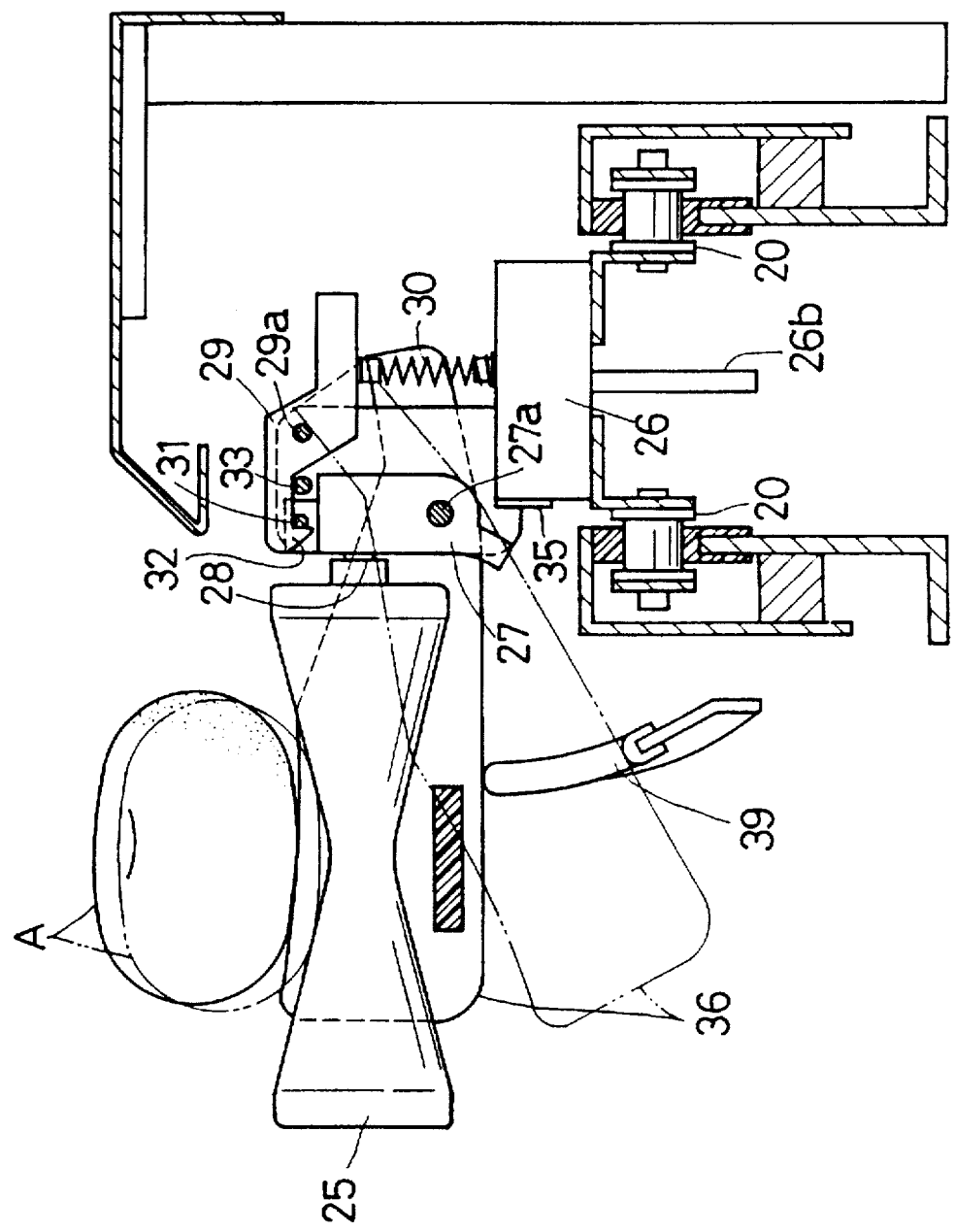
FIG. 8 is an explanatory diagram showing projecting and retracting action of the lifting member.

When each lifting member 36 is detached from the guide member 39, as indicated by virtual line in FIG. 8, the upper edge of the base end of each lifting member 36 abuts against the support shaft 39a for supporting the detent lever 29, and the upper edge of each lifting member 36 is projected slightly above the rollers 25 in tilting position for discharge (see FIG. 9), below the rollers 25 in the horizontal mounting position, and the slope is smaller than the rollers 25, and at the height of the oranges A mounted between the rollers 25 being pushed up, the rotation is defined at the discharge side of the oranges A toward the discharge direction, to the sinking position of the slope.

The guide member 39 has the middle portion corresponding to the front and rear inspection regions stretched at the height horizontal toward the feed direction, and the starting end side is tilted so as to be gradually higher toward the feed direction, while the terminal end side is tilted to be lower gradually toward the feed direction.

The roller 25 is made of synthetic resin, metal, wood, ceramics or other material, and the outer circumference of the roller 25 is formed to be larger in diameter from the outer circumference of the central part toward the outer circumference at both ends. By covering the outer circumference of the roller 25 with a member (not shown) of large contact resistance such as synthetic rubber and soft resin, the contact resistance is increased, and the oranges A mounted between the rollers 25 are rotated securely, thereby preventing change of position or posture or damage of the oranges A. Similarly, by forming plural or multiple stripes, lattices, mesh or other protrusions on the outer circumference of the roller 25 or covering member, the contact resistance is increased, and the oranges A are rotated securely. Alternatively, the outer circumference of the roller 25 may be formed in a shape same in outside diameter from the outer circumference at one end to the outer circumference at the other end.

Figure 4:
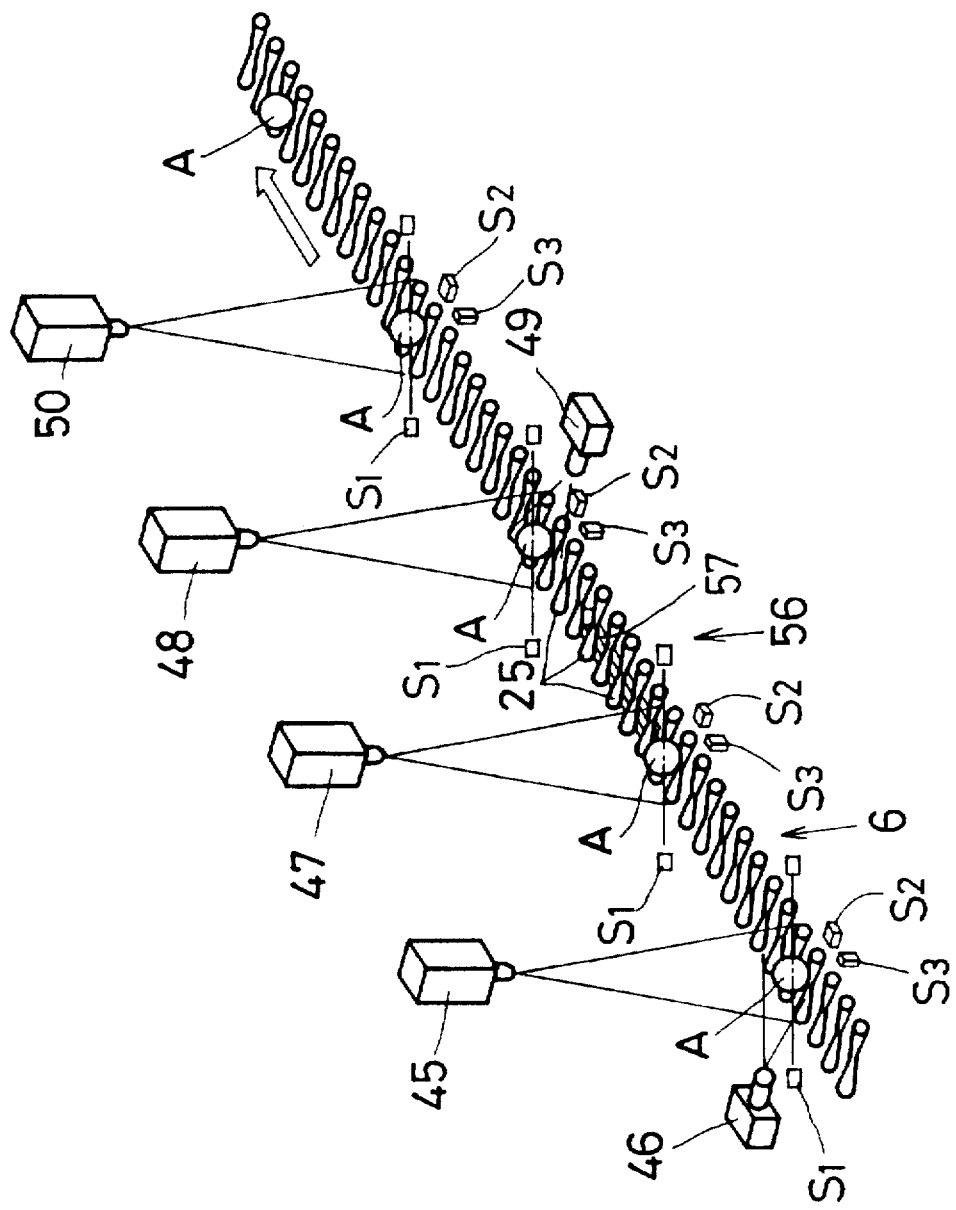
FIG. 4 is a perspective view of a class inspection device.

In the class inspection device 7, as shown in FIG. 2, FIG. 4, and FIG. 5, the entire inspection position b set on the classing conveyor 6 is enclosed by a light shield box 40, and the inside of the inspection position b is divided into the front inspection region and rear inspection region.

In the upper part of the front inspection region enclosed by a shielding cover 41, a camera 45 for inspecting the class is disposed above opposite to the upper peripheral surface of the oranges A, and a camera 46 for inspecting the class is disposed sideways opposite to the left peripheral surface, and in the upper part enclosed by a shielding cover 42, a camera 47 for inspecting rot is disposed above opposite to the upper peripheral surface of the oranges A.

In the upper part of the rear inspection region enclosed by a shielding cover 43, a camera 48 for inspecting the class is disposed above opposite to the upper peripheral surface of the oranges A, and a camera 49 for inspecting the class is disposed sideways opposite to the left peripheral surface, and in the upper part enclosed by a shielding cover 44, a camera 50 for inspecting rot is disposed above opposite to the upper peripheral surface of the oranges A.

These cameras 45 to 50 are composed of CCD camera, picture elements and other imaging means, and are connected to a judging device main body 51 (see FIG. 2) for judging the class of oranges A, and a monitor 52 for projecting the images of the oranges A, and sensors S1 S2, S3, and a detent clearing device 55 are connected to the judging device main body 51.

The oranges A moved into the shielding covers 41, 43 are illuminated by a projector 53 composed of a halogen lamp and others, and the oranges A moved into the shielding covers 42, 44 are illuminated by a projector 54 composed of an ultraviolet ray lamp and others.

Figure 9:
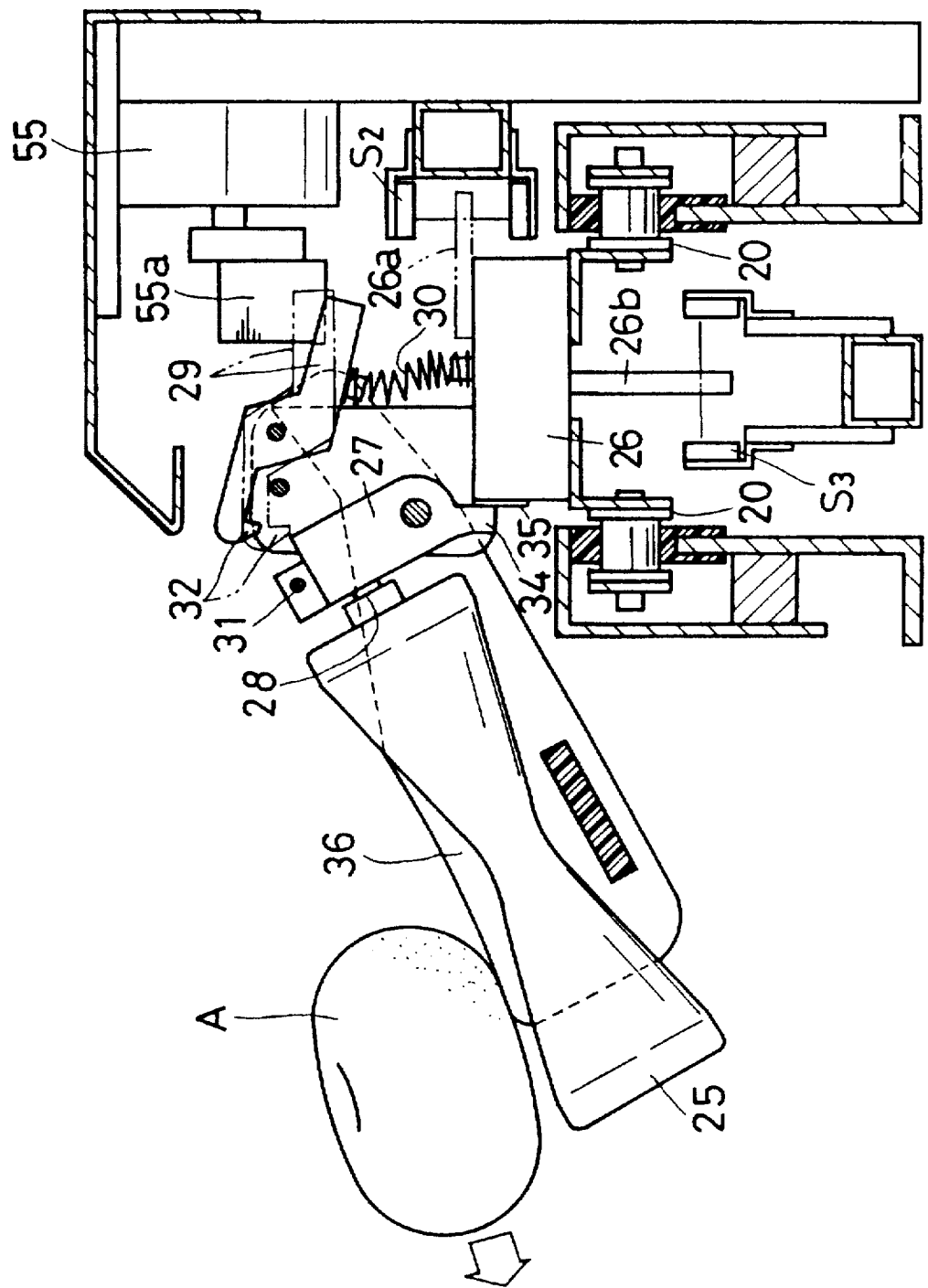
FIG. 9 is an explanatory diagram of discharge position of rotary support element and lifting member.

At four imaging positions for inspecting the class and rot, as shown in FIG. 6, an object detection sensor S1 for detecting passing of oranges mounted between rollers 25, a beginning detection sensor S1 for detecting passing of a beginning detecting element 26a fixed to the rear edge of the mounting member 26 opposite to the beginning roller 25, and a move detection sensor S3 for detecting the number of moving detecting objects 26b projected at the lower side of the mounting member 26 opposite to each roller 25 are disposed, and the beginning detection sensor S2 and move detection sensor S3 are disposed at the classing positions c to h as shown in FIG. 9.

At the detection position b, corresponding to the detection by the sensors S1, S2, S3, the upper and lower peripheral surfaces and right and left peripheral surfaces of the oranges A mounted between the rollers 25 are taken by the camera 45 to 50, and the image data taken by the cameras 45 to 50, and the moving number data of each roller 25 are stored in the judging device main body 51 in correspondence with each other.

The detent clearing device 55 is composed of electromagnetic solenoid, air cylinder, and others, and is disposed at one side of the classing positions c to h, and the detent clearing device 55 is operated independently depending on the judgment by the class inspection device 7, and the rear end of the detent lever 29 is pressed down continuously by a clearing member 55a, and the detent shaft 31 of the pivotal member 27 and the detent pawl 32 of the detent lever 29 are unlocked, and the rollers 25 on which the oranges A are mounted are oscillated in the tilting position for discharge.

On the other hand, on the outer peripheral edge of reset plates 20b, 20b (see FIG. 5) supported at the feed start end and feed terminal end of the classing conveyor 6, the rollers 25 and lifting member 36 are rotated while abutting, and only the rollers 25 are turned and reset to the horizontal mounting position to stop the detent shaft 31 and detent pawl 32, and the rotation of the rollers 25 is defined in the mounting position. It is also possible to turn and reset by reset means such as spring or by the own weight.

Figure 15:
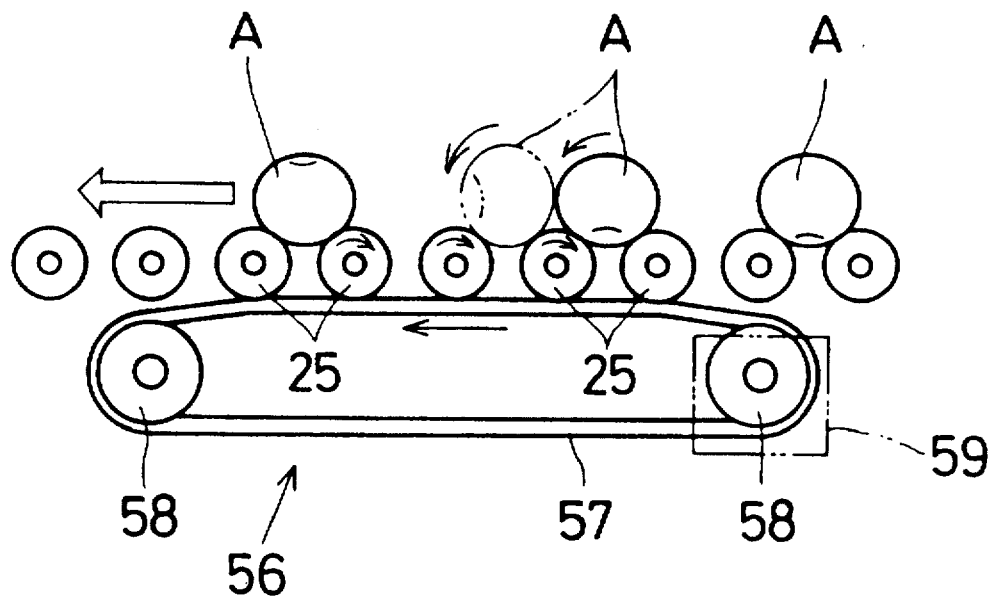
FIG. 15 is a side view showing compressed state of rotation applying belt for composing a rotor.

The rotor 56 is disposed, as shown in FIG. 5 and FIG. 15, in the lower part of the front stage of the inspection position b, and the lower part of the middle of the front and rear inspection regions, and a rotation application belt 57 made of an elastic member of large contact resistance such as synthetic rubber, soft resin or leather is stretched parallel to the feed direction, at the height and position to be compressed by the lower peripheral surface of the free end of the rollers 25.

The rotation application belt 57 is stretched between drum rolls 58, 58 supported at the feed starting end and feed terminal end, and by the driving force of a motor 59 with reduction gear, it is rotated at high speed (faster than the feed speed) in the direction coinciding with the peripheral direction of the rollers 25. Alternatively, by rotating at low speed in the direction opposite to the peripheral direction or stopping rotation, the rollers 25 compressed by the rotation application belt 57 are driven while rotating in the arrow direction in FIG. 15, and therefore by the peripheral speed difference occurring between the small end side peripheral part and large end side peripheral part of the rollers 25, the oranges A of various sizes mounted between the rollers 25 are inverted upside down (for example, 180 degrees) in the longitudinal direction in the same region.

Figure 16:
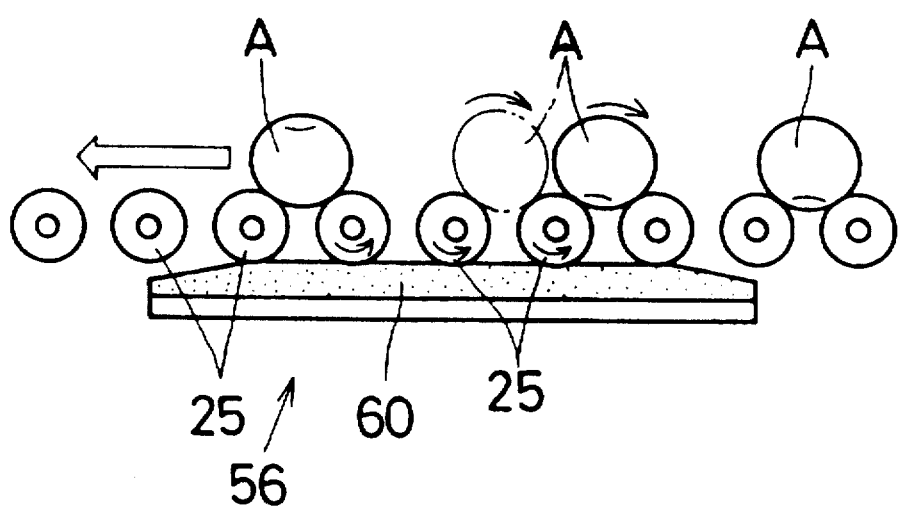
FIG. 16 is a side view showing other embodiment of a rotor.

As other method of rotation, as shown in FIG. 16, the rollers 25 are driven in contact on a rotation application pad 60 made of same member as the rotation application belt 57, so that the oranges A mounted between the rollers 25 are similarly rotated in the longitudinal direction.

Figure 17:
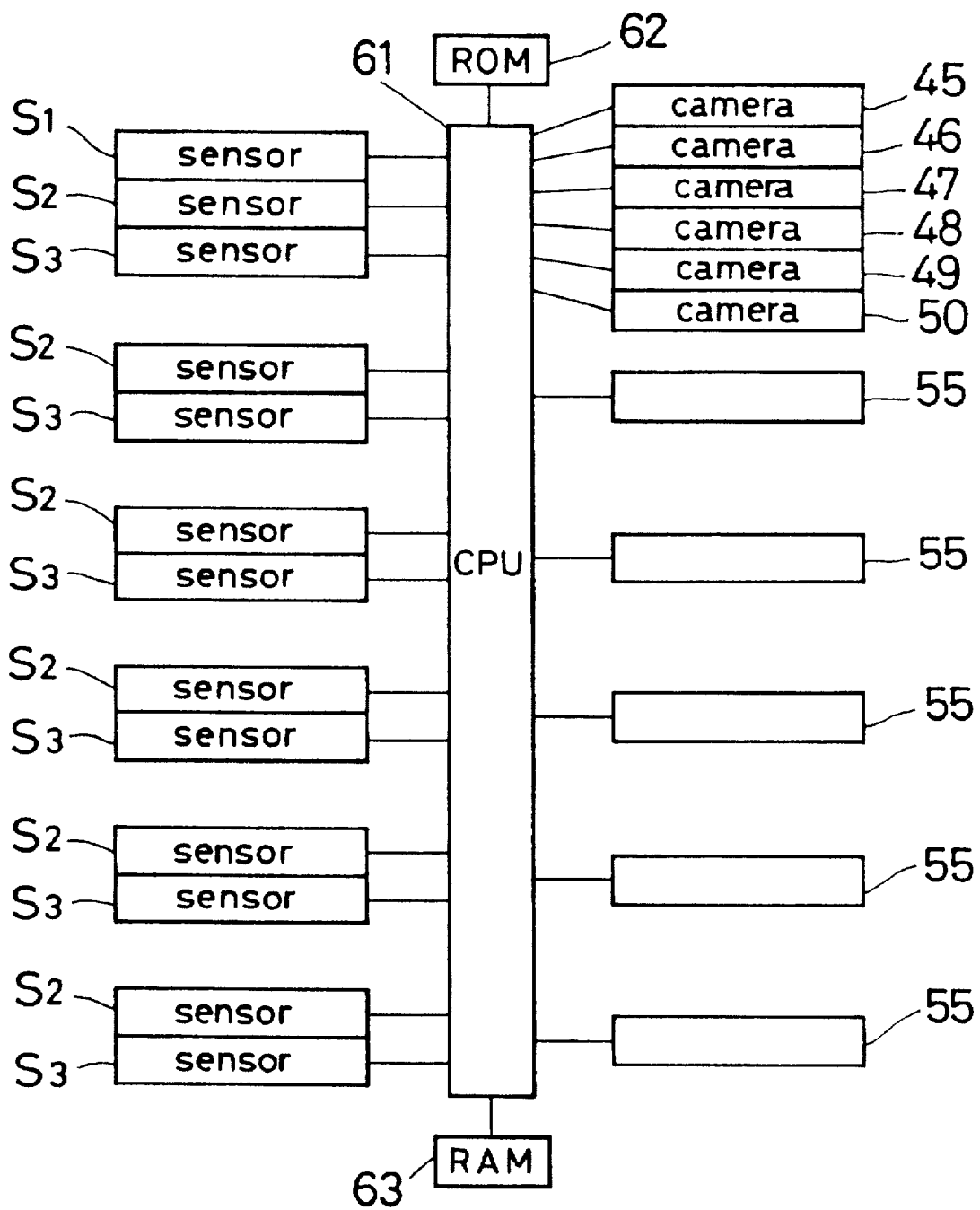
FIG. 17 is a block diagram of a control circuit of a judging device main body.

FIG. 17 shows a block diagram of a control circuit of the judging device main body 51, in which a CPU 61 controls the cameras 45 to 50, object detection sensor S1, beginning detection sensor S2, move detection sensor S3, and each detent clearing device 55 according to the program stored in a ROM 62, and executes necessary arithmetic processing, and stores various data necessary for classing operation in a RAM 63.

The CPU 61, at the detection position b, controls to take the outer circumference of the oranges A mounted between the rollers 25 by the cameras 45 to 50, according to the detection signal issued when the oranges A mounted between the rollers 25 are detected by the object detection sensor S1, inspects the class according to the image data taken by the cameras 45, 46, 48, and 49, and inspects the rot according to the image data taken by the cameras 47 and 50. That is, by comparing the class data and image data stored in the RAM 63, the class (color, sugar level, flaw, rot, outside diameter, shape, height, width, volume, flatness, maturity, and off-standard class) is judged.

The illustrated embodiment is thus composed, and its operation is described below.

First, as shown in FIG. 2 and FIG. 3, the carrying case C containing unsorted oranges A is conveyed to the feed position a on the entry conveyor 2, and the carrying case C is inverted upside down by the discharge machine 3, and the unsorted oranges A put in the carrying case C are discharged into the disperse conveyor 4.

The oranges A dispersed by the disperse conveyor 4 are distributed into the arraying conveyors 5, and the oranges A arrayed in one line by each arraying conveyor 5 are transferred onto each roller 25 of the classing conveyor 6 one by one.

Consequently, as shown in FIG. 5, by rotating the rollers 25 moved before and after the inspection position b by the rotor 56, the oranges A mounted between the rollers 25 are rotated in the longitudinal direction, and the inclined or standing oranges A are rolled, and are conveyed by aligning the direction and position.

Figure 10:
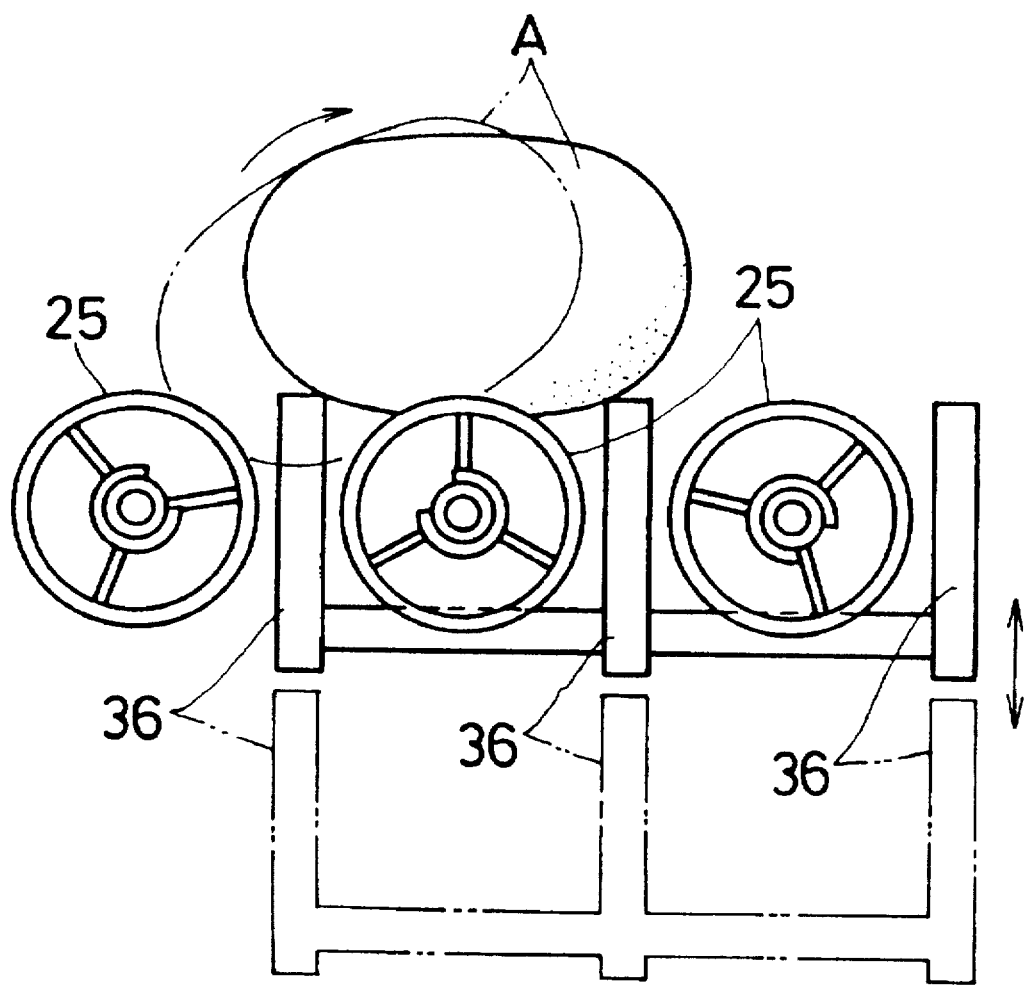
FIG. 10 is a side view showing position correction actin of large fruits.
Figure 11:
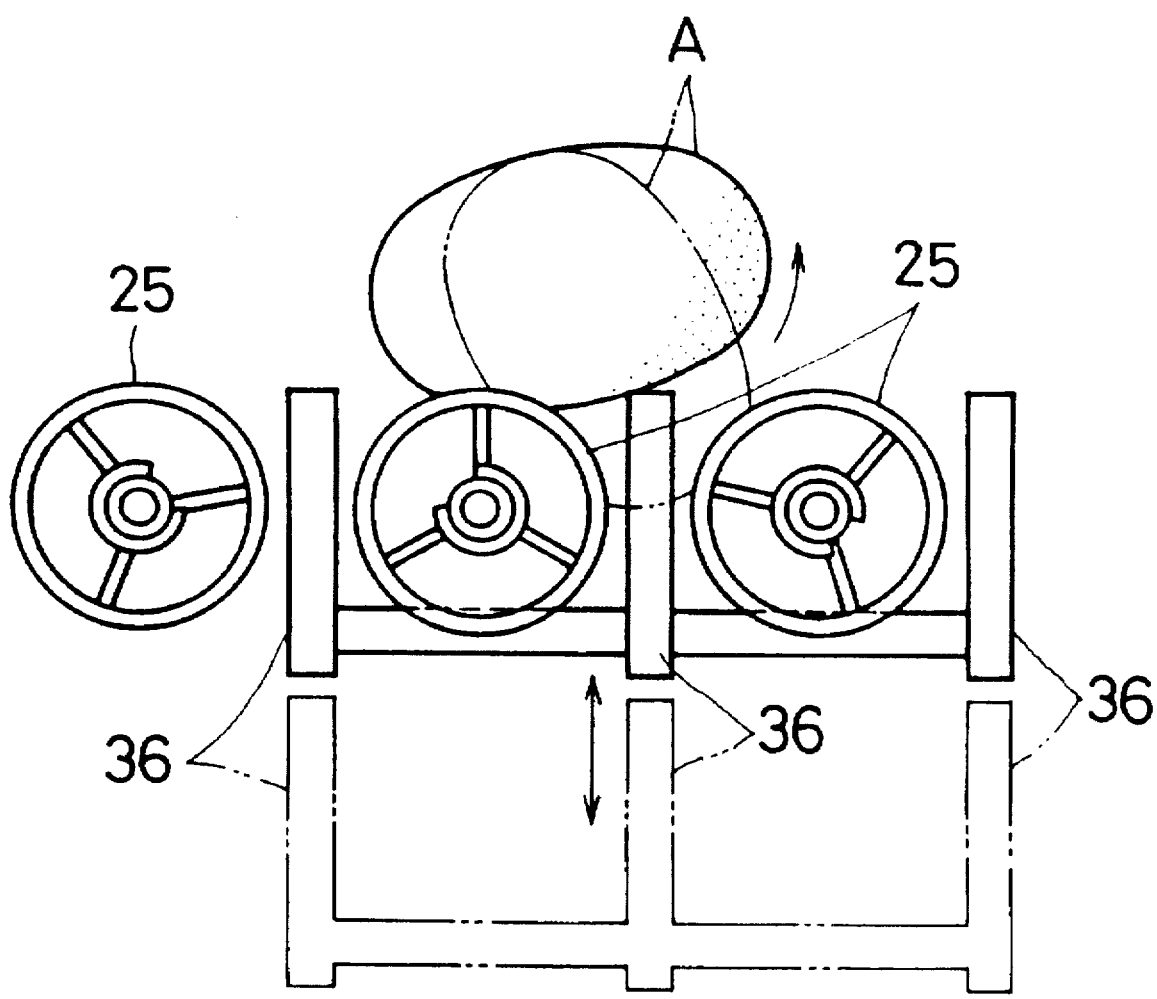
FIG. 11 is a side view showing position correction actin of small fruits.

In succession, as shown in FIG. 10 and FIG. 11, each lifting member 36 is projected slightly higher than the rollers 25, and part or all of oranges A can be lifted from the outer circumference of the rollers 25, and the oranges A in various sizes caught in between the rollers 25 or conveyed in oblique or standing position are corrected in the horizontal specified position and conveyed.

Next, when each orange A is moved to the inspection position b, the surface side periphery and left side periphery of the orange A corrected in the horizontal specified position by the lifting members 36 are taken by the cameras 45, 46, Immediately afterwards, the surface side periphery of the orange A is taken by the camera 47.

After once sinking the lifting members 36, the orange A revised (corrected) in direction is conveyed by mounting between the rollers 25.

Immediately after the front inspection region, same as above, the rollers 25 are rotated by the rotor 56, and the oranges A mounted between the rollers 25 are rotated in the longitudinal direction and inverted upside down. After inverting, the lifting members 36 are projected, and the oranges A mounted between the rollers 25 are once lifted, and the oranges A are corrected in the horizontal specified position.

In the rear inspection region, the back periphery and right periphery of the orange A are taken by the cameras 48, 49, and the front periphery of the orange A is taken by the camera 50 immediately after.

By sinking the lifting members 36, the oranges A corrected in the horizontal specified position are mounted between the rollers 25, and are conveyed while maintaining the same position.

When the oranges A are moved to the classing positions c to g, as shown in FIG. 9, corresponding to the CPU output, the detent clearing device 55 is operated, and only the rollers 25 mounting the oranges A on are turned in the tilting position for discharge, and the oranges A are discharged according to the class.

When the rollers 25 are turned in the tilting position for discharge, by the turning force, the oranges A mounted between the rollers 25 are pushed up from beneath by the lifting members 36 defined in rotation preliminarily in the tilting position, and are discharged by force. Moreover, at the lower limit position, the upper edge of the lifting member 36 is positioned higher than the upper surface of the lowered rollers 25, and the slope of the lifting members 26 is more moderate than that of the rollers 25, and therefore the oranges A are discharged obliquely downward along the upper edge of the lifting members 36, thereby preventing change of direction and position. The oranges A sorted by the class discharged into the discharge conveyors 8 disposed at classing positions c to g, and are put into boxes by manual or mechanical work. Off-standard oranges A are discharged into the recovery conveyor 9 at classing position h, and recovered and disposed.

Thus, as multiple rotary support elements, rollers 25 are disposed orthogonally to the feed direction at the conveying side of the conveying belt (see endless belt 20) stretched at one side of the conveying route, and the rollers 25 are composed to turn between the mounting position for mounting objects (see oranges A) on the upper part thereof, and the tilting position for discharging the objects at specified position, and at the inspection position b comprising the object imaging means (at least one of the cameras 45 to 50), the rotating means (see rotor 56) for rotating the rollers 25 for turning the mounted objects (see oranges A) is provided, and therefore the objects put on the upper part can be rotated through the rollers 25, while the all sides of the object, including the upper and lower surface, and right left sides can be accurately and securely inspected by the imaging means such as CCD camera.

In particular, if the objects are fruits or the like, if there is degeneration in part, such as discoloration, rot or damage, it can be securely discovered, so that adequate quality inspection and sorting work can be done. Still more, by turning the rollers 25 mounting objects in the tilting position for discharge, the objects can be discharged at an arbitrary position, so that it may be applied in conveying works, for example, distributing, feeding, and sorting.

Moreover, in the gaps of the rollers 25, lifting members 36 for lifting at least part of the objects for correcting the objects mounted between the rollers 25 in a specified position (horizontal position in the embodiment), and therefore the gaps of the rollers 25 are effectively utilized, and the objects caught in the rollers 25, or objects conveying in oblique or standing position are corrected into specified position (for example, horizontal position) regardless of the size, so that accurate inspection is possible in the same condition.

In addition, by inserting the lifting members 36 between the rollers 25, it is designed to control to project and retract between the projecting position for lifting at least part of the objects from the rollers 25, and the sinking position for sinking beneath the rollers, and therefore when projecting the lifting members 36, the object position is corrected to the specified position (for example, horizontal), and when sinking the lifting members 36, the corrected objects are put back onto the rollers 25 in specified position (for example, horizontal), so that the conveying position of the objects may be stabilized.

At the object discharge positions (see classing positions c to h), the rollers 25 and the lifting members 36 are simultaneously tilted downward from the conveying belt (see endless belt 20) side, and at the lower limit position, as shown in FIG. 9, the upper edge of the lifting members 36 is designed to be positioned higher than the upper surface of the lowered rotary support elements, and therefore the objects can be discharged smoothly downward along the upper edge of the lifting members 36 of moderate slope, thereby preventing change of direction and position of the objects effectively.

Moreover, comprising the imaging means (at least one of the cameras 45 to 50) for taking the objects mounted on the rollers 25 at the inspection position b, and the judging means (see the judging device main body 51) for judging the objects on the basis of the data taken by the imaging means, the quality and class of the objects can be judged automatically.

Still more, comprising the carry conveyor (see the classing conveyor 6) including multiple rollers 25, and the feed conveyor (see the arraying conveyor 5) for feeding objects into the carry conveyor, the holding means (see pressing belt 19) for holding the object position is disposed between the se conveyors 5 and 6, and therefore in spite of the simple constitution, motion of the objects transferred from the feed conveyor to the carry conveyor is prevented, and the objects can be fed while favorably holding the direction, position and interval of the objects.

As disclosed in the embodiment, moreover, in the constitution, by counting the number of moving rollers 25 moved to each position on the basis of the detection by the beginning detection means (see sensor S2) and move detecting means (see sensor S3), comparing and judging the moving number data counted at the inspection position b and classing positions c to h, and sorting the objects by class, it is free from effects of elongation of chain, or dislocation occurring in the engaging portion of the sprocket and chain, and therefore sorting error and discharging error will not occur, so that the sorting of objects by class can be done accurately and promptly.

Figure 18:
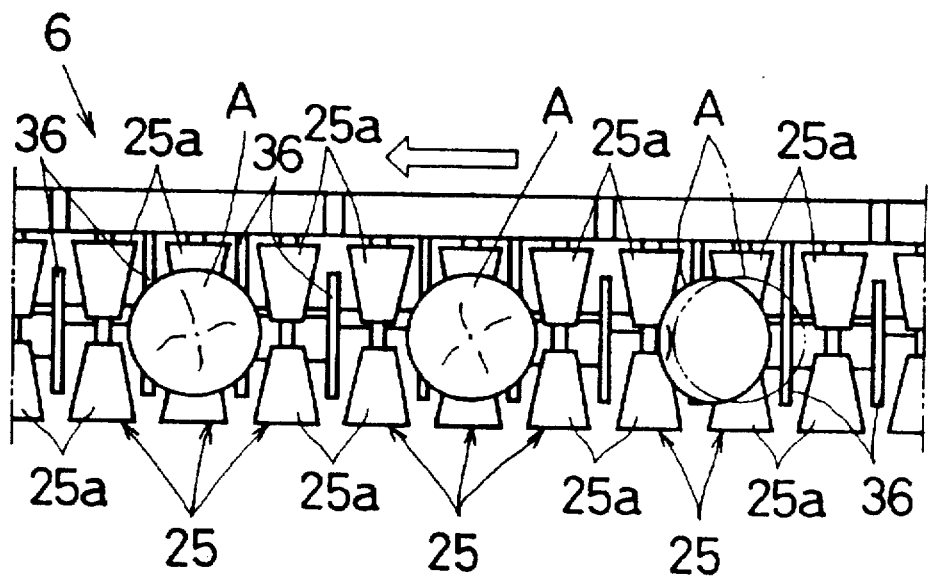
FIG. 18 is a plan view showing other embodiment of a classing conveyor.

FIG. 18 shows other embodiment the rollers 25, and in this embodiment, two conical rollers 25a, 25a are borne relatively to each other, and these two rollers 25a, 25a are composed to be adjustable to contact or depart, and by rotating the right and left rollers 25a, 25a in same direction, a peripheral speed difference is caused between the small end outer periphery and large end outer periphery of the rollers 25, so that the oranges A of various sizes are rotated in the longitudinal direction, and by imaging the whole circumference securely, class judging and sorting jobs can be done accurately. Moreover, the same effects are obtained by inclining and bearing the cylindrical or columnar rollers 25a, 25a in a V-form. Yet, by rotating the right and left rollers 25a, 25a independently in the confronting directions, the oranges A can be also rotated in the horizontal direction.

Figure 19:
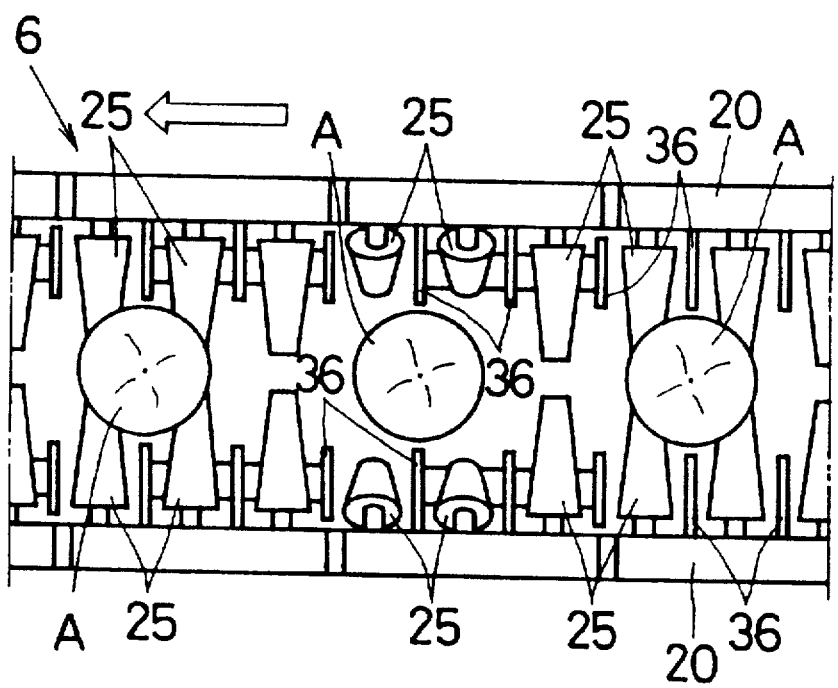
FIG. 19 is a plan view showing a different embodiment of a classing conveyor.

FIG. 19 shows a different embodiment of the classing conveyor 6, and in this embodiment, conical rollers 25 are disposed oppositely to the endless belts 20, 20 stretched laterally. When the right and left rollers 25 are turned in the tilting position for discharge, the oranges A are discharged in the lower central part along the right and left lifting members 36 defined in rotation preliminarily in the tilting position, and therefore the discharge position and discharge posture of the oranges A can be defined, the discharging speed can be suppressed, and spoiling of commercial value of the oranges A can be prevented. Same effects are obtained by arranging the right and left rollers 25 alternately.

In the correspondence between the constitution of the invention and the above embodiments:

The rotary support elements of the invention correspond to the rollers in the embodiments, and similarly the objects to oranges A, the conveying belt to the endless belt 20, the rotary means to the rotor 56, the imaging means to at least one of the cameras 45 to 50, the judging means to the judging device main body 51, the carry conveyor to the classing conveyor 6, the feed conveyor to the arraying conveyor 5, and the holding means to the endless pressing belt 19.

It must be noted, however, that the invention is not limited to the composition of the above embodiments alone.

For example, instead of the guide member 39 (projecting and retracting means) of the fixed structure stretched at a specified height, the guide members 39 may be raised or lowered by actuators such as air cylinder and hydraulic cylinder, so that the lifting members 36 may be projected or retracted.

Moreover, as the objects, aside from the illustrated example of fruits (see oranges A), citrus, persimmon, potato, processed food, electrical or mechanical parts, balls, or other spherical or elliptical objects may be handled, and the roller mounting position, and object specified position by holding member may be horizontal position, nearly horizontal position or other depending on the objects to be handled.

What is claimed is:

1. In an object sorting and conveying system comprising conveying means for conveying an object to an inspection location, means for feeding the object to the conveying means, and means for inspecting the object at the inspection location by an imaging means, the improvement comprising said means for inspecting comprising:

a plurality of rollers rotatably supported on respective axes in a spaced relationship so as to provide a space capable of holding said object between any two of said plurality of rollers, each of said plurality of rollers being shaped to have a first diameter at axial ends thereof and a second diameter at an axial middle thereof, said first diameter being larger than said second diameter;

means for selectively and serially rotating next adjacent ones of said plurality of rollers so that said object is rotated between adjacent ones of said plurality of rollers to be exposed to inspection by said imaging means on at least three dimensions thereof;

a plurality of blades, each located between adjacent ones of said plurality of rollers, said blades being shaped to have a straight top surface and movable to an upper position and a lower position so that in the upper position the top surface of said blade is disposed in a straight line between the outer diameter of said ends and the smaller dimension of said middle portion of said rollers;

means for selectively moving said blade to said upper position so that said blade causes movement of said object disposed at least partially between said rollers to a specified position in said inspection location for inspection by said imaging means; and whereby cooperative action by said means for rotating said rollers and said means for moving said blade causes said object to be suitably positioned for three dimensional inspection and judgment by said imaging means; and means for selectively tilting said plurality of rollers concurrently with said blades in the upper position so that said object is discharged without any interference from the difference in said first and second diameters of the rollers.

2. The system of claim 1, wherein said imaging means comprises means for imaging the object and means for judging the object based on data priorly stored in said imaging means.

3. The system of claim 1, wherein said means for feeding comprises a pair of conveyor belts disposed adjacent to each other and operating in a feed direction with one conveyor belt having a different speed from the other conveyor belt.

4. The system of claim 3, wherein said means for inspecting comprises means for holding the object in position for inspection.

* * * * *